United States Patent
Turnbull et al.

(10) Patent No.: US 11,445,000 B2
(45) Date of Patent: Sep. 13, 2022

(54) MULTICAST TO UNICAST CONVERSION

(71) Applicant: BRITISH TELECOMMUNICATIONS PUBLIC LIMITED COMPANY, London (GB)

(72) Inventors: Rory Turnbull, London (GB); Timothy Stevens, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 17/298,205

(22) PCT Filed: Nov. 28, 2019

(86) PCT No.: PCT/EP2019/082956
§ 371 (c)(1),
(2) Date: May 28, 2021

(87) PCT Pub. No.: WO2020/109496
PCT Pub. Date: Jun. 4, 2020

(65) Prior Publication Data
US 2022/0131920 A1    Apr. 28, 2022

(30) Foreign Application Priority Data

Nov. 30, 2018 (EP) .................... 18209655

(51) Int. Cl.
| | | |
|---|---|---|
| *H04L 65/611* | (2022.01) | |
| *H04L 65/75* | (2022.01) | |
| *H04L 65/65* | (2022.01) | |

(52) U.S. Cl.
CPC ............ *H04L 65/75* (2022.05); *H04L 65/611* (2022.05); *H04L 65/65* (2022.05)

(58) Field of Classification Search
CPC . H04L 65/601; H04L 65/4076; H04L 65/608; H04L 65/75; H04L 65/611;
(Continued)

(56) References Cited

U.S. PATENT DOCUMENTS

2002/0003799 A1    1/2002 Tomita
2014/0068690 A1    3/2014 Luthra et al.
(Continued)

FOREIGN PATENT DOCUMENTS

CA     2 983 891     11/2016
CN     105578308     5/2016
(Continued)

OTHER PUBLICATIONS

Proxicaster IP/IP, DVEO: Digital Productivity, Computer Modules, Inc., 11409 West Bernardo Court, San Diego, CA 92127, © 2019 Computer Modules, Inc. (2 pages).
(Continued)

*Primary Examiner* — Oanh Duong
(74) *Attorney, Agent, or Firm* — Nixon & Vanderhye P.C.

(57) ABSTRACT

Presented are methods for converting a multicast media stream to unicast segments, for delivery over generic IP networks such the Internet. The unicast segments can be converted back again to a multicast stream that is identical to the original multicast stream closer to the consuming client device. Information required to regenerate a multicast stream from the generated unicast segments that is identical to the original multicast stream is also encoded into the file name of the generated unicast segments. Additionally, RTP header information from the multicast stream that is not required when the unicast segments are generated are stored in files linked to the generated unicast segments, enabling the multicast stream that is regenerated to be identical to the original multicast stream even at the RTP level.

10 Claims, 5 Drawing Sheets

(58) Field of Classification Search
CPC ....... H04L 65/65; H04L 65/612; H04L 65/70; H04L 65/765
See application file for complete search history.

(56) References Cited

U.S. PATENT DOCUMENTS

| | | | |
|---|---|---|---|
| 2014/0282777 A1 | 9/2014 | Gonder et al. | |
| 2016/0044078 A1 | 2/2016 | Hosur | |
| 2016/0127798 A1 | 5/2016 | Yamagishi | |
| 2016/0269801 A1 | 9/2016 | Harden et al. | |
| 2016/0373496 A1* | 12/2016 | Yamagishi | H04L 65/4076 |
| 2017/0013296 A1 | 1/2017 | Millar et al. | |
| 2017/0127147 A1 | 5/2017 | Crabtree et al. | |
| 2017/0366588 A1* | 12/2017 | Appleby | H04L 65/608 |
| 2017/0374127 A1 | 12/2017 | Hosur | |
| 2020/0021867 A1* | 1/2020 | Park | H04N 21/26258 |

FOREIGN PATENT DOCUMENTS

| | | | |
|---|---|---|---|
| CN | 108023736 | 5/2018 | |
| EP | 2 601 757 | 6/2013 | |
| GB | 2464452 | 4/2010 | |
| JP | 2008-187626 | 8/2008 | |
| WO | 2009/129367 | 10/2009 | |
| WO | 2012/018337 | 2/2012 | |
| WO | WO-2015001985 A1 * | 1/2015 | .............. G06T 9/007 |
| WO | WO-2015058389 A1 * | 4/2015 | ......... H04L 65/4076 |
| WO | 2015/150736 | 10/2015 | |
| WO | 2016/107733 | 7/2016 | |
| WO | 2020/109491 | 6/2020 | |
| WO | WO-2020109834 A1 * | 6/2020 | ........... H04L 65/103 |

OTHER PUBLICATIONS

U.S. Appl. No. 17/298,360 to Turnbull et al., filed May 28, 2021 (31 pages).
International Search Report for PCT/EP2019/082956, dated Jan. 30, 2020, 3 pages.
International Search Report and Written Opinion for PCT/EP2018/082950 dated Jan. 30, 2020, 15 pages.
Written Opinion of the ISA for PCT/EP2019/082956, dated Jan. 30, 2020, 7 pages.
GB Combined Search and Exam Report for GB 1819608.9 dated Mar. 25, 2019, 7 pages.
GB Search Report for GB 1819610.5 dated Mar. 28, 2019, 3 pages.
Search Report for EP 18209655.2 dated Feb. 18, 2019, 9 pages.
Search Report for EP 18209653.7 dated Feb. 18, 2019, 10 pages.
Segmenting & Reassembly of Multicast Streams (A33661), Feb. 14, 2018, Stellarix Search Report, 25 pages.
International Preliminary Report on Patentability for International Application No. PCT/EP2019/082956 dated Jun. 10, 2021 (9 pages).
International Preliminary Report on Patentability for International Application No. PCT/EP2019/082950 dated Jun. 10, 2021 (10 pages).

* cited by examiner

MULTICAST TO UNICAST CONVERSION

This application is the U.S. national phase of International Application No. PCT/EP2019/082956 filed 28 Nov. 2019, which designated the U.S. and claims priority to EP Patent Application No. 18209655.2 filed 30 Nov. 2018, the entire contents of each of which are hereby incorporated by reference.

FIELD OF THE INVENTION

This invention relates to the field of multicast to unicast conversion, and in particular to the generating of a unicast segments from a multicast stream that can be converted back to an identical copy of the original multicast stream.

BACKGROUND TO THE INVENTION

Currently linear media delivery, such as of live television channels, when delivered over IP networks uses one of two quite different networking technologies: one based on multicast and the other based on unicast. With multicast transmission, a single multicast stream carrying the content is pushed from a content server to multiple network nodes simultaneously, with those network nodes duplicating the content and forwarding to any subsequent nodes or clients as required. With unicast transmission, multiple streams of content are pulled from the server, one stream for each device consuming the content, typically using HTTP over TCP.

Multicast makes efficient use of the network when delivering the same content at the same time to many end devices. However, it often requires continual allocation of network resources regardless of the amount of viewing, so that a channel is delivered through the network even if no-one is actually watching it. In addition, not all end devices, such as some tablets and smartphones, presently support multicast. Similarly, not all networks are set up to support multicast.

Unicast suffers from sending multiple copies of the same channel content through the network, but requires no usage-independent allocation of network resources. However, if audiences are expected to be small for a particular channel, it may be more efficient overall to deliver that channel over unicast instead. This means that for those parts of the network where a channel has no viewers, the channel is not delivered and the network capacity can be re-used. Unicast is also capable of delivering to almost all end devices.

IPTV services, such as the applicant's BT TV service, can be delivered over broadband using multicast to set-top boxes (STBs). BT TV comprises around 140 linear channels and a range of on-demand content. The linear channels are delivered over a dedicated IP multicast network. However, a parallel unicast network is used to deliver to other devices such as smart phones and tablets, as many of these devices do not natively support multicast, and in most instances the supporting mobile network may not have multicast support.

As well as the multicast and unicast networks being separate, the technologies have evolved independently and use largely incompatible media formats, with encoding, packaging, formatting and encryption being different for multicast and unicast, even if the original video is the same.

Therefore it would be beneficial to have a solution that allows a choice of whether to carry video over multicast or over unicast, without the end client being aware of which route the video had taken, and being able to switch between the two as the audience size changes.

SUMMARY OF THE INVENTION

It is the aim of embodiments of the present invention to provide a method of generating unicast segments from a multicast stream that can be converted back to an original copy of the multicast stream.

According to one aspect of the present invention, there is provided A method of segmenting a multicast stream into unicast segments, wherein the multicast stream comprises a sequence of real time transport protocol packets, each real time transport protocol packet comprising a header and a payload, and each payload portion comprising a plurality of transport stream packets, said method comprising:

receiving the multicast stream;
generating a plurality of unicast segments comprising transport stream packets taken from the multicast stream;
generating a file name, one for each of the unicast segments, wherein the file name for each given unicast segment comprises a plurality of portions;
generating a header file associated with each of the unicast segments, said header file comprising the header from the real time transport protocol packets;
generating a file name, one for each of the header files, wherein the file name for each of the header files comprises a subset of the portions of the filename of the associated unicast segment.

The file name generated for a given unicast segment may comprise data derived from the header of one or more of the transport stream packets in that unicast segment. The unicast file name portions may comprise the derived data.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the invention present methods for converting a multicast media stream to unicast segments, which can be delivered over generic IP networks such as the public internet. The unicast segments can be converted back again to a multicast stream that is identical to the original multicast stream closer to the consuming client device. As such, the client will be unaware of the conversion, and thus does not require any modification to consume the regenerated multicast stream. Information used to assist with the seamless switching between the unicast stream and the original multicast stream is encoded into the file name of the generated unicast segments. Additional information required to regenerate a multicast stream from the generated unicast segments that is identical to the original multicast stream is also encoded into the file name of the generated unicast segments. Additionally, RTP header information from the multicast stream that is not required when the unicast segments are generated are stored in files linked to the generated unicast segments, enabling the multicast stream that is regenerated to be identical to the original multicast stream even at the RTP level.

Since the multicast-unicast-multicast conversion process results in an exact recreation of the original multicast stream, network intelligence can decide whether to carry the traffic via the multicast network or the unicast network, whilst not causing problems for existing multicast-only service client devices. The final unicast to multicast conversion step could be carried out in the home gateway for example. This would also allow dynamic switching between the delivery modes, to allow greater flexibility in the way the unicast and multicast networks are used.

The generated unicast segments are standards-compliant HLS, and therefore in principle playable on unicast-only devices such as tablets, smartphones & computers.

Figure 1:
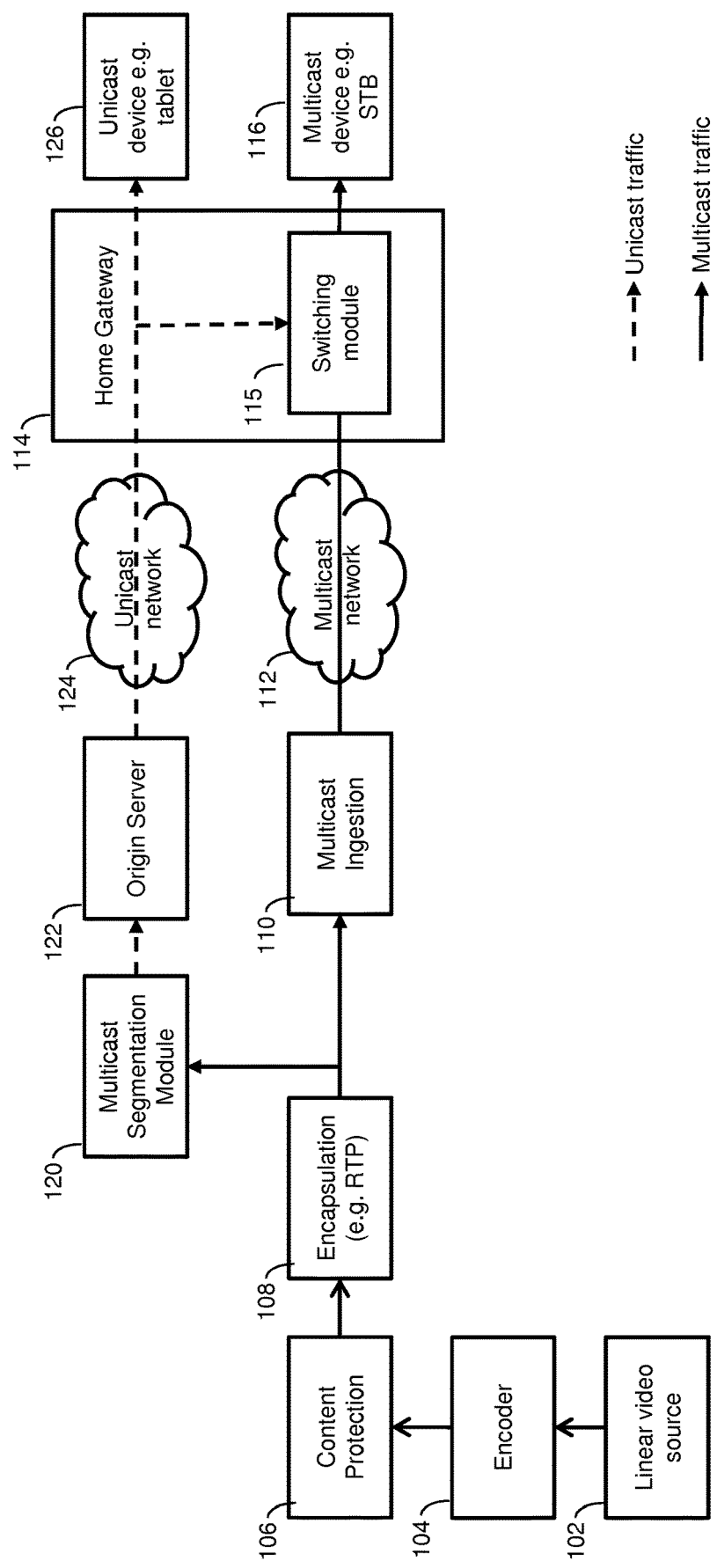
FIG. 1 is a network diagram of an arrangement in an example of the present invention.

FIG. 1 shows a network arrangement 100 in an example of the present invention. The network 100 contains elements arranged to encode and send media content, such as video and audio streams associated with linear TV channels, to client devices. The media is either carried as unicast traffic or multicast traffic depending on whether the client devices support unicast or multicast. Examples of the present invention present a multicast segmentation module 120 that can segment a multicast stream into unicast segments that can be transmitted over a unicast network. A switching module 115 can reassemble those unicast segments back into an exact copy of the original multicast stream from which they were generated and control switching between the original multicast stream and the reassembled multicast stream. The description that follows sets out the general operation of the network as a whole, as well as the specific operation of the multicast segmentation module 120 and the switching module 115.

The network 100 includes a linear video source 102, which generates media content in the form of uncompressed video and audio streams associated with live TV channels. In practice, the linear video source may supply media content associated with multiple TV channels, but for simplicity, the operation of examples of the invention will describe content associated with a single channel.

The uncompressed video and audio streams associated with a channel are passed to an encoder 104. The encoder 104 encodes the uncompressed video to generate an encoded video stream. In this example, the video encoding method used is in accordance with the ITU H.264 standard, though the invention is not limited to such a standard, and other video encoding methods could be used instead. The encoder 104 also performs audio encoding on uncompressed audio to generate an encoded audio stream, which is multiplexed with the encoded video stream.

The encoder 104 also performs packaging of the encoded video and audio streams into a multiplexed format, such as the MPEG-2 Transport Stream as specified in ISO/IEC 13818-1, which is often used for multicast streaming. An MPEG-2 transport stream consists of a sequence of transport stream packets (referred to herein as TS packets). Each TS packet carries 184 bytes of payload data, prefixed by a 4 byte header. Thus, several hundred or even thousands of TS packets might be required to carry video content of a second in duration, though this will depend largely on the bitrate used for encoding the content.

TS packets contain a variety of different data types, Elementary Streams and Tables, carried in the payload portions of the TS packets. Elementary Streams carry the video, audio, subtitles etc that represent the media being streamed. A typical programme or media sequence will have one video Elementary Stream, and several audio Elementary Streams (as there are usually multiple audio tracks), with each Elementary Stream requiring a very large number of TS packets. Additionally, there is also meta-data, which are represented as Tables and provide information important for understanding what data is being carried in the TS packets. Other Tables will contain programme guide data, service identification information, etc. Each TS packet will contain only one data type—Elementary Stream or Table.

The TS packets are optionally passed to content protection module 106, which can apply content protection using suitable Conditional Access System (CAS) technology, and encrypt the TS packet payload portions. The TS packet headers remain unencrypted. The resulting TS packets are passed to the encapsulation module 108.

The encapsulation module 108 encapsulates the TS packets using RTP (real time transport protocol) in this example. Specifically, the TS packets are carried encapsulated in the payload portion of RTP packets. The output from the encapsulation module 108 is a stream of RTP packets, which effectively forms a multicast stream.

Figure 2:
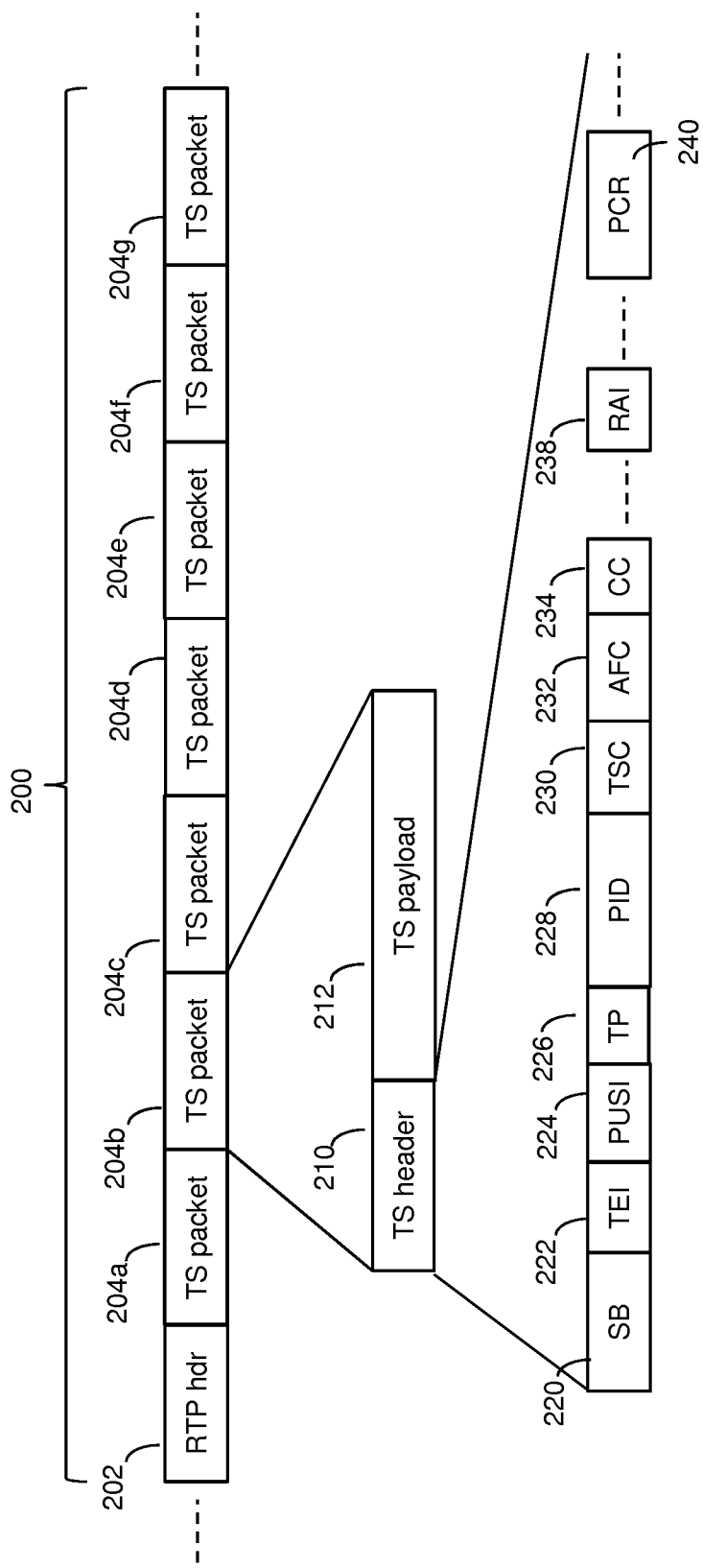
FIG. 2 illustrates the packet structure of an example RTP-TS packet.

FIG. 2 shows the packet structure of an example RTP packet 200 and the underlying TS packets that it carries.

The RTP packet 200 is made up of an RTP header portion 202, which is 12 bytes long, followed by a payload portion 204. In this example, the payload portion is made up of 7 TS packets (204a-204g), each 188 bytes long, resulting in a total RTP packet size of 12+7*188=1328 bytes.

As described earlier, each TS packet comprises a TS header portion 210, 4 bytes long, and a TS payload portion 212, 184 bytes long. The TS header 210 is always unencrypted, which allows examples of the invention to use some of the data stored therein even when CAS has been employed.

The TS header 210 comprises the following fields: a sync byte SB 220 (8 bits long), a transport error indicator TEI 222 (1 bit), a payload unit start indicator PUSI 224 (1 bit), a transport priority TP 226 (1 bit), a packet identifier PID 228 (13 bits), a transport scrambling control TSC 230 (2 bits), an adaptation field control AFC 232 (2 bits), a continuity counter CC 234 (4 bits). The TS header 210 may also contain an adaptation field (of variable length) that follows the continuity counter field if signalled in the AFC. The adaptation field can contain various additional fields. Two selected additional fields have been shown in the figure (others have been omitted for simplicity)—a random access indicator RAI 238 (1 bit) and a program clock reference PCR 240 (42 bits), both of which are used in examples of the present invention.

The PID is assigned to each Elementary Stream or Table. Thus, all TS packets associated with a given Elementary Stream will have the same PID assigned to that Elementary Stream. Two Tables that are always present in an MPEG-2 Transport Stream are a single Programme Association Table (PAT) and one or more Programme Map Tables (PMTs). The TS packet containing the PAT is always assigned a PID of zero. The PAT contains an entry for each channel or programme indicating the PID used by the PMT for that channel or programme. The PMT for a given channel contains the PIDs of all the Elementary Streams associated with that channel. The PAT and PMTs are located in the payload of the respective TS packet.

Thus, TS packets that contain the PAT and PMT are essential to allow a client decoder to understand what all the TS packets contain. A decoder must first receive a TS packet with a PAT (PID=zero) before it is able to identify the packets containing the PMT, using the PID of the PMT obtained from the PAT, and thus decode the contents of the rest of the stream. Without the PAT and PMTs, the rest of the stream is effectively meaningless, as the decoder has no idea what is in each packet. The PATs and PMTs appear periodically in the multicast stream typically at ~200 ms intervals.

The PCR 240 appears at least every 100 ms in the adaptation fields. It is used to derive the system timing clock and is measured using a 27 MHz system clock. The Random Access Indicator 238 is a flag that indicates that the current TS packet has some information to aid random access from this point. Both the PCR 240 and random access indicator 238 are located in the adaptation field. The standards specification also states that the RAI flag can only be set to '1' if the PCR field present. Thus, the PCR 240 will always be present if the RAI flag is set to '1'.

The continuity counter 234 is unique for each PID, and increments monotonically for each TS packet associated with a PID, wrapping to zero after reaching its maximum value.

The RTP header 202 also contains various fields. These include the Timestamp, which is derived from the transport stream PCR, and the Sequence Number, which allows clients to detect RTP packet loss or re-ordering (since the underlying UDP transport is unreliable).

Referring back to FIG. 1, the multicast stream leaving the encapsulation module 108 is formatted suitably for multicast transmission. This multicast stream is passed to both the multicast ingestion server 110 as well as the multicast segmentation module 120.

The multicast ingestion server 110 receives the multicast stream and controls the delivery of the multicast stream onto a multicast delivery network 112. The multicast stream is delivered over the multicast network 112 to a multicast enabled device 116, such as a set-top box (STB), via a switching module 115 in a home gateway 114. The home gateway 114 connects to the multicast network as well as other networks, such as the Internet, using for example a DSL connection. Client devices, such as the multicast device 116, can connect to the home gateway 114 over a local area network.

The multicast client 116 can thus subscribe to and receive multicast media content in the multicast stream delivered from the multicast ingestion sever 110 over the multicast network 112.

However, as discussed earlier, it would be beneficial to be able to deliver the content over standard Internet connections using unicast delivery. Dynamic switching can thus be performed between unicast or multicast as required.

To achieve this, a multicast segmentation module 120 is provided, which generates unicast segments from the multicast stream received from the encapsulation module 108. The unicast segments that are generated are compliant with Apple's HLS (HTTP Live Streaming) protocol as set out in RFC8216, and thus can be played back on an HLS unicast compliant client device, such as a smartphone or tablet 126. Furthermore, the unicast segments can be used to regenerate an identical copy of the original multicast stream by a switching module 115, which is preferably located in the home gateway 114. The regenerated multicast stream can then be delivered to the multicast device 116 from the home gateway 114.

The HLS segments generated by the multicast segmentation module 120 are passed to the unicast origin server 122. A playlist or 'm3u8' manifest file is also generated containing a sequential list of the generated unicast segments. The unicast segments are often stored at the same location as the manifest, here the origin server 122, although it may be explicitly stated in the manifest if not. The manifest is updated each time a new unicast segment is generated. The oldest segment reference is usually removed from the top of the manifest, with the new segment reference added to the bottom. Typically, the manifest contains a reference to five or six segments, and the segments themselves hold between two to five seconds worth of media content. To stream content, a unicast client reads the manifest and issues an "HTTP GET" request for each segment in sequence. The client concatenates the segments to re-form the continuous stream during playback.

The advantage of using HLS for unicast delivery is that HLS adheres to the same general MPEG-2 Transport Stream format as used for the multicast stream, thus facilitating the conversion from multicast to unicast. In essence, HLS segments are made up of the same TS packets that are used in the multicast stream—where each HLS segment typically comprises a large number of TS packets. However, there are some important factors to take into consideration when segmenting the multicast stream into unicasts segments.

In order that the resulting unicast segments are HLS compliant and can be played on a unicast device, the unicast segments cannot be generated by arbitrarily segmenting the multicast stream (of TS packets). As described earlier, in order for a client to process TS packets, the PAT and PMT tables must be found and processed first. Presented are methods for capturing the required PAT and PMT data and generating unicast segments including the requisite PAT and PMT data.

Furthermore, a generated unicast segment cannot start with an arbitrary TS packet, even if the required PAT and PMT data is present. Instead, a new unicast segment must start with a TS packet marked with a RAI flag (after the PAT & PMT packets), so that a decoder is able to start decoding without further information. However, the RAI may not be present in the first TS packet following the RTP header in the multicast stream.

The operation of the multicast segmentation module 120 in relation to generating unicast segments from the multicast stream will be described with reference to the flow charts of FIGS. 3 and 4.

Figure 3:
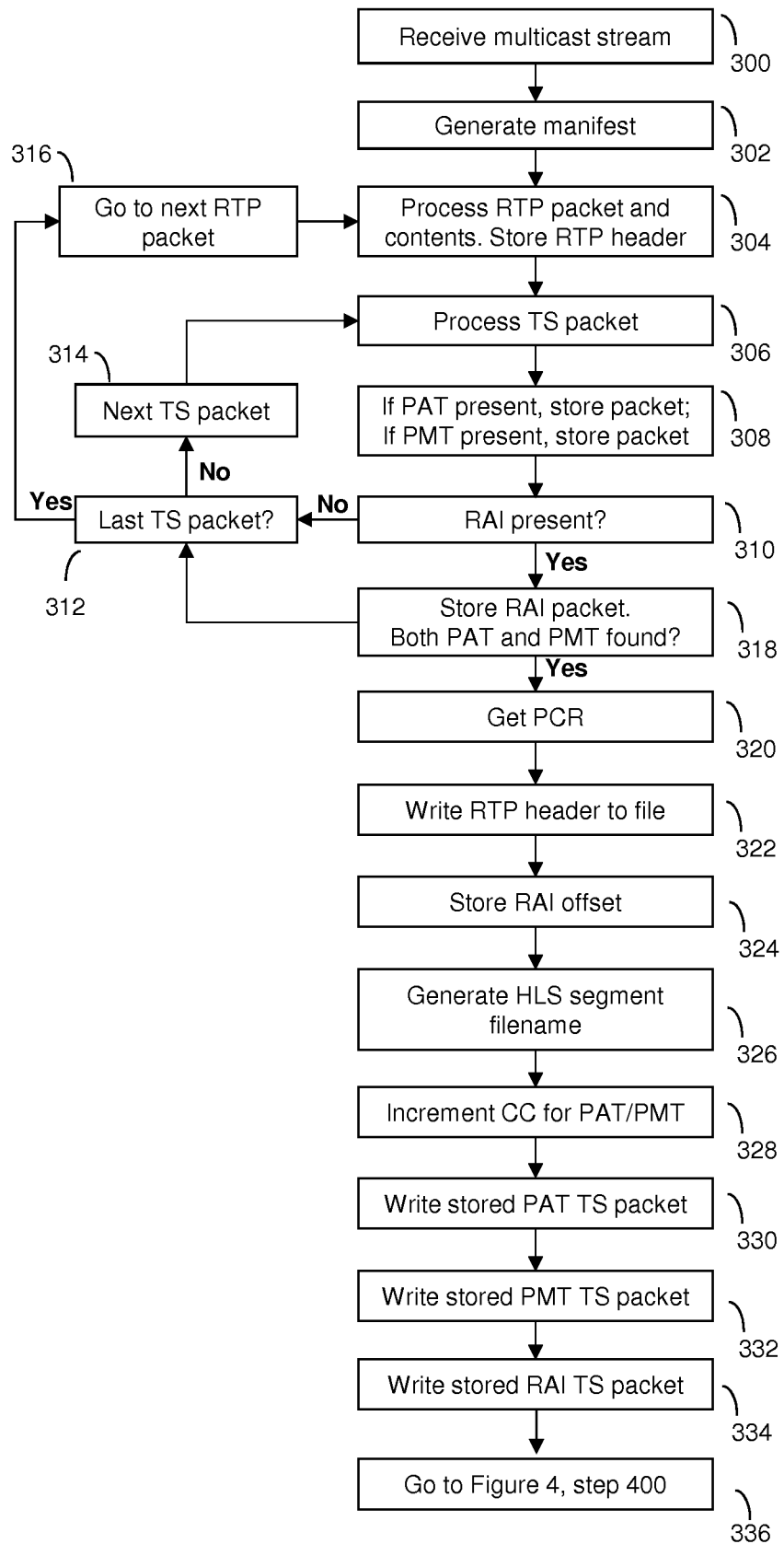
FIG. 3 is a flow chart summarising the steps of an example of the invention in a "starting state phase"

FIG. 3 describes steps during a "starting state phase", when a multicast stream is first read by the multicast segmentation module 120, and the TS packets are read until all the starting packets required for a unicast segment are found. As described earlier, the starting packets required for an HLS compliant segment are a TS packet containing a PAT, a TS packet containing a PMT, and a TS packet containing a RAI.

Figure 4:
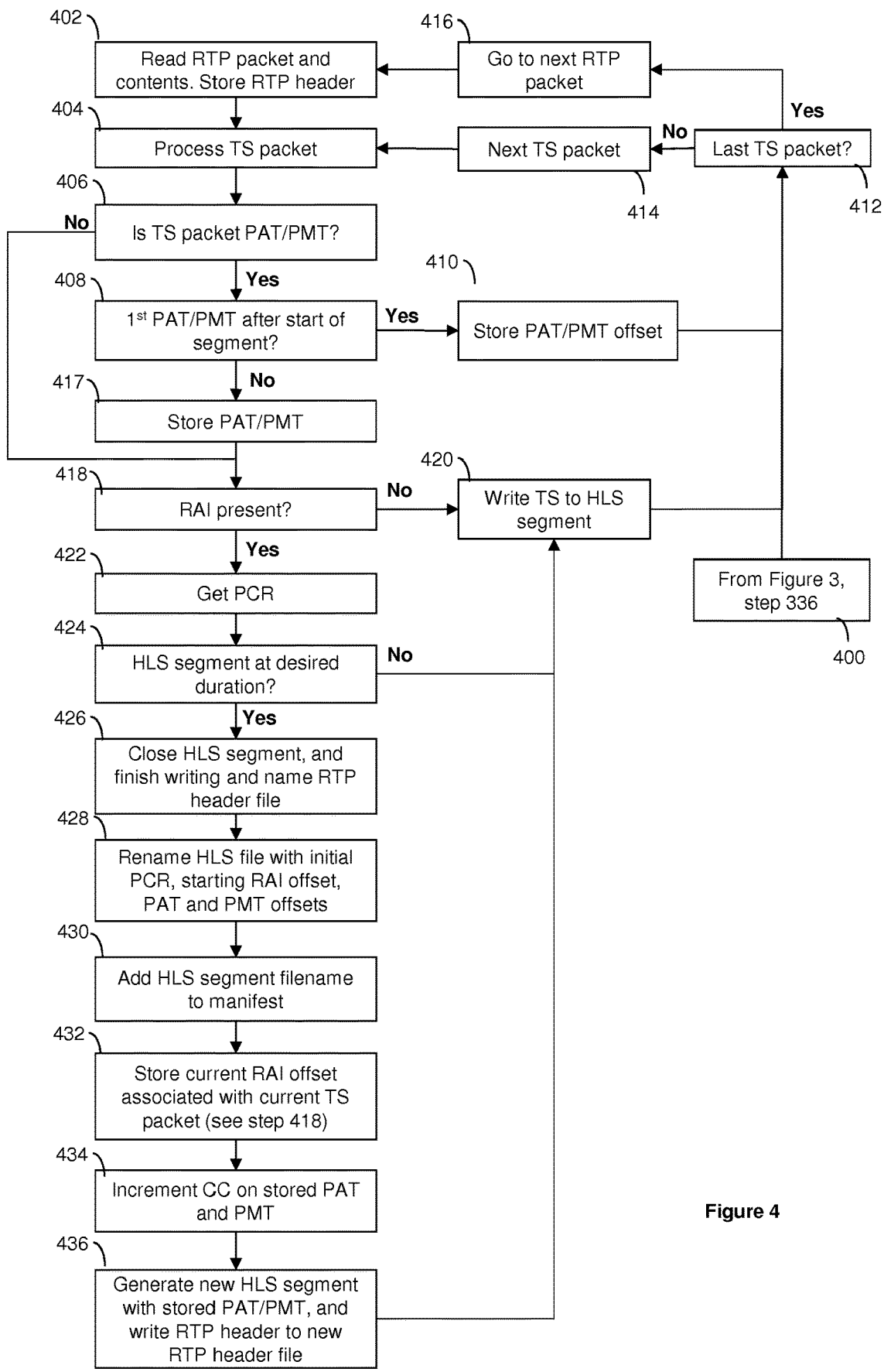
FIG. 4 is a flow chart summarising the steps of an example of the invention in a "steady state phase"

FIG. 4 describes the steps that follow during a "steady state phase", occurring after the "starting state phase" of FIG. 3.

Figure 5:
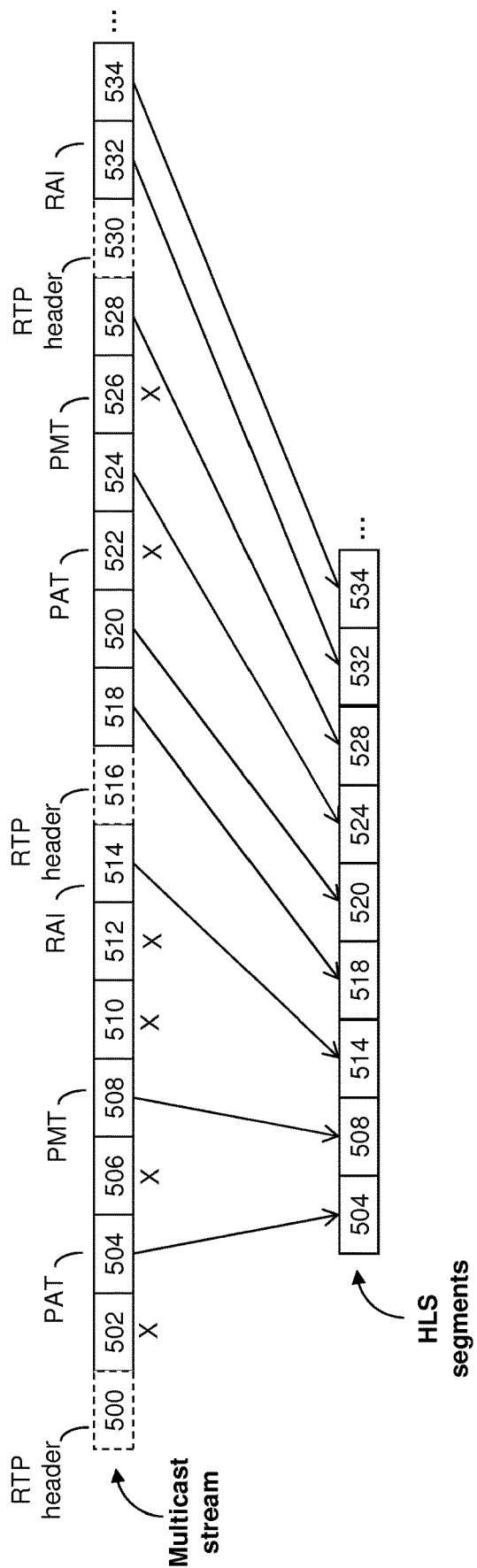
FIG. 5 shows an example RTP stream and generated unicast segment.

FIG. 5 shows an example of the multicast stream, comprising a continuous stream of RTP packets, with each RTP packet comprising an RTP header and a number of TS packets (e.g. RTP header 500 and TS packets 502 to 514). FIG. 5 also shows an example HLS segment and the mapping between the TS packets from the RTP packet to the generated HLS segment.

The segmentation of the multicast stream into HLS (unicast) segments will now be described with reference to the flow charts of FIGS. 3 and 4.

Starting with FIG. 3. In step 300, the multicast stream is received at the multicast segmentation module 120.

In step 302, an empty manifest is generated and stored in the origin server 122 for use later with the generated unicast segments.

In step 304, the first RTP packet and its contents (the TS packets) are processed. The RTP header (e.g. 500 in FIG. 5) is stored in a temporary store for writing to a file later. Only one RTP header is stored at any one time during the starting state phase resulting in only one RTP header being written to file in step 322. As will be described later, once processing moves to the steady state phase, more than one RTP header can be temporarily stored. Thus, if processing cycles back to step 304, where another RTP header needs to be stored, any previous RTP header stored will be effectively deleted.

In step 306, a TS packet is processed. When processing first starts, the first TS packet in the RTP packet that has been read is processed. Using FIG. 5 as an example, the first TS packet being processed is 502. In step 308, a check is made to determine whether the TS packet being processed contains either a PAT or PMT. If the TS packet contains either a PAT or a PMT, that TS packet is stored before processing passes to step 310. In this example, TS packet 502 does not contain either a PAT or a PMT, so processing continues onto step 310 without storing the TS packet. Next in step 310, a check is made to determine if the TS packet includes a RAI flag set. If no RAI is present, then processing passes to step 312 to check if the current TS packet is the last TS packet in the RTP packet being processed. If it isn't the last TS packet, then processing moves onto the next TS packet in step 314, before looping back to step 306 to process the next TS packet. If it is the last TS packet, then processing moves onto the next RTP packet in the multicast stream in step 316, before looping back to step 304 to process that RTP packet.

Thus, for TS packet 502, which does not contain a PAT, PMT or RAI, processing simply loops back to step 306 to process the next packet, TS packet 504, effectively discarding TS packet 502. The next packet, TS packet 504 does contain a PAT, and so that packet is temporarily stored (for writing to the generated HLS segment later) before processing loops back to step 306 to process the next TS packet 506. The next packet, TS packet 506 does not contain a PAT, PMT or RAI, so processing loops back to step 306 to process the next packet, TS packet 508, effectively discarding TS packet 506. TS packet 508 contains a PMT, so that packet is stored before processing loops back to step 306 to process the next TS packet 510. Neither of the next 2 packets, TS packet 510 and 512, contain a PAT, PMT or RAI, so processing loops back to step 306 to process the next packet, TS packet 514, effectively discarding TS packets 510 and 512.

Now, TS packet 514 does contain an RAI, so when processing reaches step 310 to check an RAI is present, the answer is yes, and processing passes to step 318.

In step 318, the TS packet with the RAI (TS packet 514) is stored, and a check is made to determine if both the PAT and PMT have been found. In this example, they have (TS packets 504 and 508, and stored in earlier loops of step 308). Processing then passes to step 320. However, if the PAT and PMT have not been found, then processing passes back to step 312.

Thus, the processing of steps 304 to 318 are cycled through until the required starting TS packets of a PAT, PMT and RAI have all been found. Once these TS packets have been found, processing steps out of the loop and into step 320 to begin the process of writing the required starting packets and then subsequent TS packets to a new HLS segment.

In step 320, the PCR value is read from the current TS packet containing the RAI (note, a PCR field will always be present when there is an RAI in accordance with the standards).

In step 322, the RTP header that was temporarily stored from step 304 is written to the RTP file. A discussion of this aspect will follow later. Note, only one RTP header is written to the RTP header file at this point, as only one RTP header is stored in step 304. The temporary store is then cleared down.

In step 324, calculate and store the offset of the RAI TS packet within the RTP packet. In this example of the RAI TS packet 514, its offset is 7, that is to say the TS packet with the RAI is the $7^{th}$ TS packet in the RTP packet.

In step 326, the HLS segment file name is generated. As described earlier, additional information used to assist with switching between the generated unicast stream and the original multicast stream is encoded into the file name of the generated unicast segments.

Additional information required to regenerate a multicast stream from the generated unicast segments that is identical to the original multicast stream is also encoded into the file name of the generated unicast segments.

In examples of the present invention, five pieces of information, or fields, are encoded into the segment file name:

1. A base name e.g. Btbarker
2. A PCR value e.g. 1055988510639
3. The offset of the starting TS packet (i.e. RAI packet) within the RTP frame e.g. 7
4. The position where we have removed the first PAT, e.g. 3
5. The position where we have removed the first PMT, e.g. 5

The five fields can be concatenated into a resulted file name. In this example, the file name would be: Btbarker_1055988510639_5_3_5.ts Note values shown above are merely examples, and in practice some of the values may be quite different. In particular the PAT and PMT offsets may be significantly larger.

The relevance of each piece of information will now be discussed. Note, the PAT/PMT positions are not available until later in the process.

Starting with the base name, this is an arbitrary name used at the start the file name.

The PCR value is used by the switching module 115 to synchronise the regenerated multicast stream with the original multicast stream to enable seamless switching between the two. The PCR is the high resolution clock that appears every 100 ms in the stream, and is obtained in step 320 from the TS packet header. The PCR is encoded in the HLS segment file name so that the switching module 115 is provided with the PCR as soon as the segment is read. In practice, the switching module 115 will know the correct PCR as soon as it has read the manifest with the HLS file name, and further when it has read the HLS file itself.

This means the switching module 115 can initiate seamless switching without having to decode the PCR found within individual TS packets of the HLS segments. It also allows segmentation to take place in multiple places and ensures the file names remain consistent, which is important for locating the correct RTP headers as will be discussed later.

Synchronisation between the regenerated multicast stream and the original multicast stream is at a synchronisation point where there are matching PCR values in both streams.

However, knowing the PCR from the HLS file name means that there is no need to immediately start regeneration of the multicast stream from the HLS segments until an HLS segment is found that has a matching PCR value with the original multicast stream. This avoids having to potentially regenerate numerous RTP packets that are not required before a synchronisation point is reached.

The offset of the starting TS packet within the RTP frame is also encoded in the file name. That is to say, the offset of the TS packet containing an RAI as obtained in step 324. The offset is required for the switching module 115 to reconstruct an exact copy of the original multicast stream.

Finally, the positions where the first PAT and the first PMT packets have been removed are encoded. However, these are not available at this stage. The removal of these packets and their significance will be described later with reference to FIG. 4.

Therefore, at this stage in step 326, the file name will be missing the removed PAT and PMT positions, but the other information will be available, and so the file name can be generated using this information. So where the base filename is "Btbarker", the PCR is 1055988510639, and the RAI offset is 7, then the resulting HLS file name is Btbarker_1055988510639_7.ts. The missing information of the removed PAT and PMT positions will be added later when the following PAT and PMT packets have been removed.

Turning back to the flow chart of FIG. 3, in step 328, the continuity counter CC associated with the stored PAT and the continuity country CC associated with the stored PMT are incremented. This is because the PAT/PMT we are writing to the HLS segment is an earlier one that precedes the RAI we are using. The next PAT and PMT pair, packets 522 and 526, could be used instead, but that would require buffering of the intermediate TS packets starting from the RAI 514 until packets 522 and 526 have been read. Instead, the solution chosen here is to use the PAT and PMT already available, packets 504 and 508, and remove the next PAT and PMT packets 522 and 526, whilst incrementing the continuity counters for the used PAT and PMT packets 504 and 508 to ensure the continuity counters used match those of the pair that would have been used but will now be deleted.

In step 330, the TS packet containing the PAT that was stored in step 308 is written to a new HLS segment, with the new segment given the file name generated in step 326. Reference is made to FIG. 5, which shows TS packet 504 containing a PAT from the multicast stream written to a new HLS segment.

This is followed in step 332, where the TS packet containing the PMT that was stored in step 308 is next written to the HLS segment (in the immediate location after the PAT TS packet). Again, reference is made to FIG. 5, which shows TS packet 508 containing a PMT from the multicast stream written to the new HLS segment.

Then in step 334, the TS packet containing the RAI that was stored in step 318 is written to the HLS segment (located after PMT TS packet). Again, reference is made to FIG. 5, which shows TS packet 514 containing a RAI from the multicast stream written to the new HLS segment.

Processing then passes to step 336, and onto FIG. 4, step 400, where remaining TS packets are copied from the RTP segments until the generated HLS segment is at a desired duration.

The steps of the method illustrated in FIG. 4 cover a "steady state phase", where subsequent TS packets from the multicast stream are written to the new HLS segment until the duration of the generated HLS segment reaches a desired predetermined duration. After which, new HLS segments are generated.

Starting with step 400, processing passes to step 412, where a check is made to determine if the current TS packet being processed is the last TS packet in the RTP packet. If it isn't the last TS packet, then processing moves onto the next TS packet in the RTP packet in step 414, before passing to step 404 to process the next TS packet. If it is the last TS packet (in this example, TS packet 514 is being processed, and is the last packet), then processing moves onto the next RTP packet in the multicast stream in step 416, before passing to step 402. In step 402, the RTP packet and its contents (the TS packets) are read. The RTP header (in this example, the RTP header is element 516 in FIG. 5) is stored in a temporary store for use later, before processing passes to step 404. Note, more than one RTP header can be temporarily stored now, and thus if processing cycles back to this point, further RTP headers can be temporarily stored.

In step 404, the TS packet is processed. In the example of FIG. 5, the current TS packet is TS packet 518. In step 406, a check is made to determine whether the TS packet contains either a PAT or PMT. If the TS packet does not contain a PAT or PMT, then processing continues to step 418, where a check is made to determine if the TS packet includes a RAI flag set. If no RAI is present, then processing passes to step 420 to write to current TS packet to the generated HLS segment, before returning to step 412 to check on whether the current TS packet is the last in the RTP packet before determining the next TS packet to process. The effect of steps 406, 418 and 420 is that any TS packet that does not contain a PAT, PMT or RAI will get added to the HLS segment, before the next TS packet is similarly processed. Thus, in the example of FIG. 5, TS packets 518 and 520 are both written directly to the HLS segment as they do not contain a PAT, PMT or RAI.

The next TS packet to be processed is TS packet 522, which does contain a PAT.

Thus, when processing reaches step 406 where a check is made to determine if a PAT or PMT is present, TS packet 522 is a PAT, and thus processing passes to step 408. In step 408, a check is made to determine if the PAT or PMT is the first PAT or first PMT after the starting PAT or PMT (from step 308/330/332, and packets 504 and 508). If it is, then processing passes to step 410, where the offset of the PAT or PMT is stored.

The PAT and PMT offsets can be measured a number of ways. One approach is with reference to the start of the current HLS segment, or put another way, the position of where the PAT or PMT packet would be located in the current HLS segment if was being written next. In a second approach, reference can be made to the starting RAI packet in the RTP stream, or put another way, the position of the Pat TS packet relative to the starting RAI packet (counting only TS packets and not including RTP header).

Turning back to the example TS packet 522, this is the first PAT after the starting PAT (packet 504), and thus the offset of the PAT packet is stored, before processing moves onto the next TS packet via step 412. Using the first approach referencing the start of the HLS segment, the PAT offset would be 6. Using the second approach referencing the starting RAI packet, the PAT offset would be 3. Here the second approach is used. Thus, the TS packet with the first PAT/PMT after the starting PAT/PMT is not written to the HLS segment, instead only the offset is stored for use later (see packet 522 in FIG. 5).

However, if in step 408, the PAT/PMT is not the first after the starting PAT/PMT, then processing passes to step 417 where the PAT/PMT TS packet is stored. Note, only one PAT TS packet and one PMT TS packet is stored at any one time. Thus, later PAT and PMT TS packets will overwrite earlier stored PAT and PMT TS packets. The purpose of storing these PAT and PMT TS packets is that they are required for the start of the next HLS segment that is generated.

Processing the turns to step 418, and continues as described above. So, if a TS packet is a PAT or PMT, and it is not the first after the starting PAT or PMT, then that TS packet is written to the HLS segment in step 420.

The purpose of storing the offsets of the first PAT packet and PMT packet after the starting PAT and PMT packets is that these first packets after the starting ones are not written to the generated HLS segment. In effect, an earlier set of PAT/PMT packets (see packets 504 and 508) are used. Thus, these "first" PAT and PMT packets are deleted to balance the number of packets out. However, the offset stored from step 410 allows these "deleted" PAT and PMT packets to be reinserted into the correct positions in the regenerated multicast stream.

The next packet to be processed is TS packet 524, which does not contain a PAT, PMT or RAI. Thus, TS packet 524 is written to the HLS segment.

After TS packet 524, TS packet 526 is processed. This is the first TS packet to contain a PMT after the starting PMT, and thus the offset is stored, but the TS packet is not written to the HLS segment. Here the second approach for measuring the offset is used (as per the PAT offset), which references the starting RAI packet, resulting in a PMT offset of 5.

Then, TS packet 528 is processed, which does not contain a PAT, PMT or RAI, and is written to the HLS segment.

The next TS packet to be processed is TS packet 532 (following the reading of a new RTP packet). This TS packet contains an RAI. Thus, when processing reaches step 418, an RAI is found to be present, and processing passes to step 422.

In step 422, the PCR value is obtained from the current TS packet containing the RAI (as discussed earlier, a PCR field will always be present when there is an RAI in accordance with the standards).

Then in step 424, the PCR value from step 422 is used in conjunction with the initial PCR value from step 320 to determine if the duration of the current HLS segment is at least equal to a predetermined target duration. For example, the target duration may be 5 seconds, and so the difference in the PCR values must be at least equal to 5 seconds.

The aim is to generate a new HLS segment, starting with TS packet with an RAI, when the current HLS segment is at least equal to the target segment duration. Otherwise writing to the current segment continues until the next RAI packet and the duration check repeated.

Thus, in step 424, if the duration of the current HLS segment is not at the desired duration, processing passes back to step 420 to write the TS packet to the HLS segment before processing the next packet.

However, if at step 424, the current HLS segment is at the desired duration, then processing moves onto step 426.

In step 426, the generated HLS segment is closed, which effectively concludes the generation of this HLS segment, before the RTP header file generation is completed. The result is a generated HLS segment and an associated generated RTP header file.

To complete generation of the RTP header file (the same RTP header file from step 322), further RTP headers are written to it from the temporary store. Specifically, all the RTP headers except for the most recent entry are written from the temporary store to the RTP file, before those headers are deleted from the store. The most recent entry is retained in the store for later writing to a new RTP header file associated with the next HLS segment to be generated. The RTP header file is then closed. The RTP header file can be stored with the HLS segments in the origin server 122.

The name assigned to the RTP header file takes a special format. In examples of the invention, the RTP header file name uses a similar naming convention to the corresponding newly generated HLS segment that has been generated. The naming convention used for the RTP file can use a subset of the fields used in the HLS segment file name, as long the fields when combined are sufficient to link the RTP file to the correct HLS segment. One approach is to use the base file name concatenated with the PCR value used for the corresponding HLS segment filename, which can be expressed as:

<base_filename>_<PCR>.stp

In the example here, the RTP file name would thus be:
Btbarker_1055988510639.rtp In effect, the file name of the RTP header file uses a subset of the fields or portions that make up the associated HLS segment filename.

Storing the RTP headers in such a manner allows regenerated multicast stream to be identical to the original multicast stream, even at the RTP header level. Furthermore, using a file naming convention for the RTP header file name that is linked to the associated HLS segment file name allows the correct RTP file to be identified directly from the HLS file name, once that has been identified.

In practice, the RTP header file can be named using any file name that is linked to the associated HLS segment name. Thus, if the HLS segment name is generated in a more general manner that does not include all the fields identified in step 326, this approach would still work. The key aspect is that file names of the header file and HLS segment file are linked, for example by sharing a common unique field or a subset of unique fields. In this example, that unique field is the PCR value.

In step 428, the generated HLS segment file name is renamed using the stored PAT/PMT offsets from step 410. Recall that in step 326, only the base name, PCR and RAI offset is available, but the PAT and PMT offsets (of the first PAT and PMT after the starting PAT and PMT packets) were not yet available. Those offsets are now available (from step 410), and thus can be added to the HLS segment file name. The offsets are concatenated with the existing file name. In this example, the PAT offset is 3 and the PMT offset is 5, resulting in an HLS file name of Btbarker_1055988510639_7._3_5.ts.

In step 430, the HLS segment file name, including the file location, is added to the manifest file. A client device would now be able to locate the HLS segment after reading the manifest file.

In step 432, the current RAI offset associated with the current TS packet is stored.

In step 434, the continuity counters CC are incremented on both the stored PAT and PMT TS packets (from step 417).

In step 436, a new HLS segment is generated. The new HLS segment will have the stored PAT and PMT TS packets (with their incremented continuity counters) written to it.

The remaining RTP header stored in the temporary store is written to a new RTP file before it is deleted from the store. This new RTP header file will be written to with further RTP headers when further RTP packets are read to populate the new HLS segment. Processing then returns to step 420, where the current TS packet, which has an RAI, is written to the HLS segment, before processing then turns to the next TS packet as described earlier.

The result is that HLS segments are generated by the multicast segmentation module 120 and written with TS packets from the multicast stream, always starting with a PAT, a PMT and an RAI TS packet.

The generated HLS segments are stored on the unicast origin server 122 together with the manifest file. To stream content, a client reads the manifest and issues an "HTTP GET" request for each segment in sequence. Examples of the client include the unicast device 126 as well as switching module 115, which makes requests for the HLS segments before regenerating RTP packets for delivery as a multicast stream to the multicast device 116. The regenerated multicast stream is identical to the original multicast stream.

The switching module 115 is responsible for regenerating a multicast stream from the generated HLS segments and RTP header files.

The switching module 115 reverses the process performed by the multicast segmentation module 120 by making an HTTP request for the manifest, then parsing that and making HTTP requests for the HLS segments as they appear. The switching module 115 is able to identify the associated RTP headers by virtue of the fact the RTP header file is similarly named to, or shares a portion of the same name with, the associated HLS segment file.

In particular, the common PCR in both the HLS segment name and the RTP header file name allows the associated files to be linked. The RTP header file can be fetched using a HTTP GET request.

The switching module 115 uses the RTP headers from RTP header file to create the RTP header portions of the RTP packets that are being regenerated.

The RAI offset in the HLS segment file name allows the switching module 115 to place the first TS packet at the correct position in the regenerated RTP packet (position 5, in the above example). The switching module 115 reads and remembers the PAT and PMT when it finds them at the start of the HLS segment, but does not write them to the regenerated RTP packets until it reaches the correct offsets as encoded in the HLS segment file name.

There now follows a further discussion of the RTP header file and its naming.

Whilst RTP headers are not required for consumption of the generated HLS segments as unicast, they are needed for regenerating an exact copy of the original multicast stream. Thus, during segmentation into the HLS segments, the RTP headers are preserved by storing them in files named using a similar naming convention to the generated HLS segments. In practice, only the PCR field is critical for matching up the HLS segment with the RTP header file. This enables the switching module 115 to infer the RTP file names from the HLS segment names published in the manifest and pair the RTP headers with the appropriate TS segments to regenerate the original multicast stream. This has a number of advantages over attempting to generate the RTP headers in the switching module 115:

Less effort computationally for home gateway (switching module 115)

Deriving the RTP timestamp (found in the RTP header) from the PCR is not straightforward and may not necessarily result in the same timestamp as in the original stream, even though RTP time stamp derivation is described in RFC2250

Ensures exact match with original multicast stream. Make switching between the original multicast stream and the regenerated multicast stream possible. It also removes any further potential problems due to incompatibilities between RTP headers generated at head-end and locally generated RTP headers at the switching module 115.

Storing them in an RTP header file named with same PCR as the corresponding HLS segment makes alignment simple.

Below is an example fragment from the HLS manifest, showing 5 HLS segments:

EXTM3U
EXT-X-VERSION:3
EXT-X-TARGETDURATION:4
EXFINF 4.41
Btbarker_1055988510639_2_129_346.ts
EXFINF 4.15
Btbarker_1056107672303_3_355_124.ts
EXFINF 4.80
Btbarker_1056219849499_0_159_341.ts
EXFINF 4.34
Btbarker_1056349369182_5_149_324.ts
EXFINF 4.99
Btbarker_1056466469070_1_51_254.ts
. . .

In this example, the corresponding RTP header files (Btbarker_1055988510639.rtp, etc.) are not listed in the manifest, however a client-end that has knowledge of this approach would know what it needs to fetch as part of the unicast to multicast regeneration. Conventional HLS clients would not know to do this, but can just request and play the unicast HLS segment files.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of operation involving segmenting a multicast stream into unicast segments, wherein the multicast stream comprises a sequence of real time transport protocol packets, each of the real time transport protocol packets comprising a header and a payload portion, and each payload portion comprising a plurality of transport stream packets, said method comprising:

receiving the multicast stream;

generating a plurality of unicast segments comprising transport stream packets taken from the multicast stream;

encoding a plurality of portions of data into a file name of each of the unicast;

generating a header file associated with each of the unicast segments, said header file comprising the header from the real time transport protocol packets; and encoding into a file name of each of the header files a subset of the portions of data of the associated unicast segment;

wherein each of the transport stream packets respectively in the generated unicast segments comprises a program clock reference field, and the subset of the portions of data comprises the program clock reference field.

2. A method according to claim 1, wherein the file name generated for a given unicast segment comprises data derived from the header of one or more of the transport stream packets in that unicast segment.

3. A method according to claim 2, wherein a portion of the file name of each of the unicast segment comprises the derived data.

4. A method according to claim 1, further comprising regenerating the multicast stream based on the generated unicast segments and the generated header file associated with each of the unicast segments.

5. A method according to claim 1, wherein
the generating of the plurality of unicast segments, the encoding of the plurality of portions of data into the file name of each of the unicast segments, the generating of the header file associated with each of the unicast segments, and the encoding of the file name into each of the header files are performed by a segmentation module.

6. A system comprising:
a computer network for providing operation involving segmenting a multicast stream into unicast segments, wherein the multicast stream comprises a sequence of real time transport protocol packets, each of the real time transport protocol packets comprising a header and a payload portion, and each payload portion comprising a plurality of transport stream packets, the computer network being configured to:
receive the multicast stream;
generate a plurality of unicast segments comprising transport stream packets taken from the multicast stream;
encode a plurality of portions of data into a file name of each of the unicast segments;
generate a header file associated with each of the unicast segments, said header file comprising the header from the real time transport protocol packets; and
encode into a file name of each of the header files a subset of the portions of data of the associated unicast segment;
wherein each of the transport stream packets respectively in the generated unicast segments comprises a program clock reference field, and the subset of the portions of data comprises the program clock reference field.

7. The system according to claim 6, wherein the file name generated for a given unicast segment comprises data derived from the header of one or more of the transport stream packets in that unicast segment.

8. The system according to claim 7, wherein a portion of the file name of each of the unicast segments comprises the derived data.

9. The system according to claim 6, further comprising regenerating the multicast stream based on the generated unicast segments and the generated header file associated with each of the unicast segments.

10. The system according to claim 6, wherein
the generation of the plurality of unicast segments, the encoding of the plurality of portions of data into the file name of each of the unicast segments, the generation of the header file associated with each of the unicast segments, and the encoding of the file name into each of the header files are performed by a segmentation module of the computer network.

* * * * *